Nov. 7, 1933.                F. A. RAGAN                1,934,090
                          BRAKE MECHANISM
                        Filed June 16, 1928
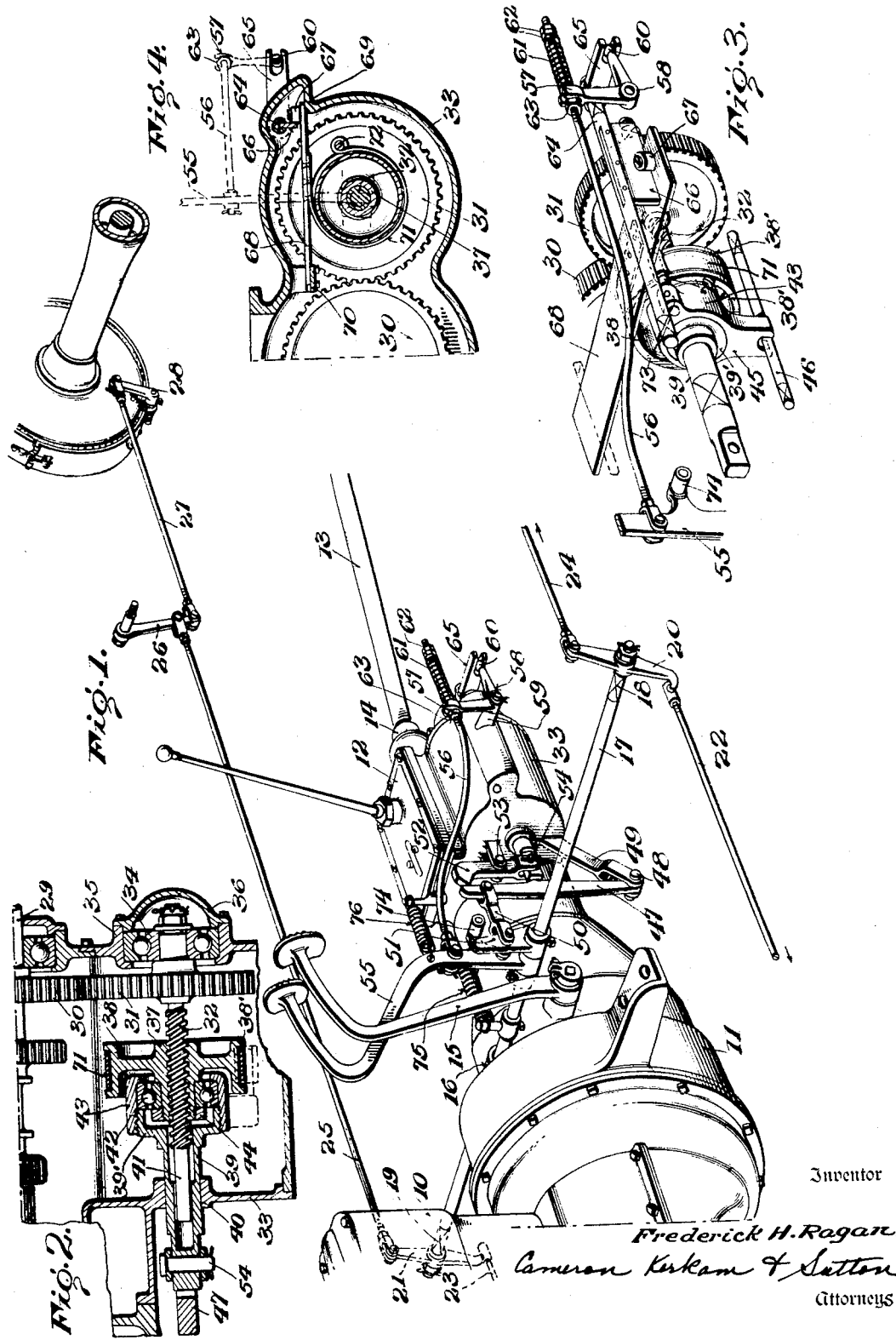
Inventor
Frederick H. Ragan.
Cameron Kirkam & Sutton
Attorneys Patented Nov. 7, 1933

1,934,090

UNITED STATES PATENT OFFICE 1,934,090

BRAKE MECHANISM

Frederick Hathaway Ragan, Cleveland, Ohio

Application June 16, 1928. Serial No. 285,960

17 Claims. (Cl. 188—140)

This invention relates to brake operating mechanism for automobiles and more particularly to a power brake operating mechanism in which the muscular effort of the operator is used merely to control the application of the brakes.

Servo-brake operating mechanisms are known in the art, but have not been generally adopted owing to various disadvantages such as the lack of a constant positive control by the operator causing uncertainty and jerkiness of action, complication and expensiveness of structure, and unnatural "feel" of the control pedal caused by the lack of a definite relationship between the force applies by the operator and the force produced by the power unit. Furthermore, certain devices which have been proposed have been inefficient or inoperative to check rearward motion of the automobile.

One object of the invention therefore is to provide a servo-brake operating mechanism which is at all times under the absolute control of the operator, which is positive and dependable in action and which operates smoothly and with little effort on the part of the operator.

Another object is to provide such a device which will operate equally well whether the car is going forward or backward.

Another object is to provide such a device in which the muscular effort of the operator is substantially proportional to the force thereby caused to apply the brakes.

Another object is to provide such a device in which the brake applying force may be easily and accurately regulated, and quickly released at the will of the operator.

Another object is the provision of such a device which will operate as an ordinary hand or foot operated brake mechanism in case the power operating mechanism should fail to function for any reason or when the vehicle is stationary.

Other objects and advantages will be apparent from the following description taken in connection with the disclosure in the accompanying drawing.

In the drawing—

Fig. 1 is a perspective view of the device as applied to a conventional type of automobile.

Fig. 2 is a horizontal mid-sectional view of the power unit and casing.

Fig. 3 is a perspective view of the power unit and control means therefor, and

Fig. 4 is a vertical section through the casing showing the power unit in end elevation.

Referring first to Fig. 1 of the drawing, numeral 10 indicates the engine of the automobile, 11 the flywheel and clutch housing, 12 the transmission housing and 13 the drive shaft, connected to the transmision by the universal joint 14. On the clutch housing is mounted the clutch pedal 15 and bearing 16 for brake shaft 17. Shaft 17 is also mounted in bearings 18 and 19 on the vehicle frame (not shown). Levers 20 and 21 are fixed on the ends of shaft 17, and are pinned at their ends to the brake rods 22 and 23 for the front wheel brakes, and 24 and 25 for the rear wheel brakes.

All these brake rods are connected to operate their respective brakes by suitable means such as illustrated in connection with brake rod 25 which is shown to be yoked to the lever 26 which is pivoted to the vehicle frame and is also yoked to the drag rod 27 which operates the brake mechanism indicated generally by numeral 28.

Referring to Fig. 2 of the drawing, the transmission shaft 29, which is in driving relation with the universal joint 14, has fixed thereon a gear 30 which is constantly in mesh with gear 31 fixed on an actuating member in the form of a screw shaft 32. This screw shaft is mounted in an offset portion 33 of the transmission casing 12, by means of a radial and thrust bearing 34 fixed in an end plate 35 of the casing by means of a cap 36.

Threaded on screw shaft 32 is a control member in the form of a nut 37 having a flanged brake drum 38 integral therewith. An operating member in the form of a thrust shaft or ram 39 is slidably mounted in the bearing 40 of the casing opposite the bearing 34, and is provided with an open bore forming a bearing for the smooth extended portion 41 of shaft 32. The inner end of thrust shaft 39 is swiveled to the hub of the nut member 37 by means of the radial and thrust bearing 42 which is clamped to the bell 39' on the inner end of the thrust shaft by the thimble 43, and to the nut by the ring 44. Rotation of thrust shaft 39 is prevented by a downwardly extending, notched arm 45 on thimble 43 (Fig. 3) which slides on the guide rod 46 fixedly mounted in the casing, parallel to shafts 32 and 39.

The outer end of thrust shaft 39 extends forwardly from the casing 33 as shown in Figs. 1 and 2, and normally rests against an abutment on the vertical lever 47 which lever is pivotally mounted at 48 on a fixed bracket 49 extending forwardly and downwardly from the casing 33. The upper end of the lever 47 is connected by means of the link 50 with the upstanding arm 51 rigidly mounted on the brake shaft 17. A lever 52 is pivoted near its center on a bracket 53 fixed to the casing 33, and extends parallel to the lever 47, with its upper end provided with an abutment engaging the upper end of lever 47, and its lower end pinned at 54 to the thrust shaft 39. As will be seen by reference to Fig. 1, the arrangement of the levers is such that motion of the thrust shaft 37 either forwardly or rearwardly will cause the lever 47 to be swung forwardly, which will rotate the brake shaft 17 in a counterclockwise direction and apply the brakes of the vehicle.

In the preferred embodiment of the invention, the abutments and fulcrums of levers 47 and 52 are so located that the mechanical advantage is the same whether the thrust shaft 37 moves forwardly or rearwardly to apply the brakes. However, this arrangement may be varied to secure unequal braking effects for forward and rearward motion of the vehicle if deemed desirable.

Brake pedal 55 (Fig. 1) is mounted on the brake shaft 17 adjacent the arm 51 and is biased to its normal position by spring 76. A draw rod 56 is yoked at its front end to the brake pedal 55 and extends rearwardly between lugs 57 on the vertical arm of bell crank lever 58. This bell crank lever is pivoted on the post 59 extending laterally from the casing 33, and has a rearwardly extending arm preferably formed with a ball 60 on the end thereof for a purpose hereinafter described. A spring 61 is mounted on the draw rod 56 behind the lugs 57 and the adjusting nut 62 threaded on the draw rod 56 so as to yieldably press the lugs 57 against the abutment 63 on draw rod 56. It will thus be seen that a forward motion of the brake pedal 55 will yieldably swing the bell crank lever 58 in a counterclockwise direction as seen in Fig. 3.

Rock shaft 64 (Figs. 3 and 4) is rotatably mounted in bearings in the ends of casing 33, and has an arm 65 fixed thereto beyond the end plate 35 of the casing, which arm is provided with a slotted bearing receiving the ball 60 on the end of the bell crank lever. Rock shaft 64 carries a downwardly extending plate 66 which normally contacts a roller 67 on a sliding plate 68. This plate 68, as shown in Figs. 3 and 4, is supported at its ends on shoulders 69 and 70 formed in the sides of the casing 33. Plate 68 is free to move both longitudinally and laterally, and has secured to its under side one end of a band 71 which encircles brake drum 38 and is caused to move longitudinally therewith by the flanges 38' on the drum. The other end of the brake band is secured to a pin 72 fixed in a bearing 73 formed on the thimble 43. It will thus be seen that rotation of shaft 64 by the bell crank lever 58 will cause the plate 66 to move the plate 68 to the right as seen in Fig. 3 and thus tighten the brake band 71 upon the drum 38, irrespective of the longitudinal position of the drum and brake.

Brake pedal 55, as shown in Figs. 1 and 3, carries a rearwardly offset portion provided with a roller 74 which is positioned behind the arm 51 on the cross shaft 17. Sufficient space is provided between the roller 74 and the arm 51 so that normally these elements do not operatively engage. However, if the power unit fails to function, the spring 61 on the draw rod 56 will yield sufficiently to allow the roller 74 to engage the arm 51 and operate the same directly from the brake pedal 55 in the conventional manner.

When the automobile is in motion, the nut member 37 normally rotates freely with shaft 32, and is held in its central position thereon by the action of the brake releasing spring 75. A slight pressure on the brake pedal 55, however, will swing the bell crank lever 58 to rotate the rock shaft 64 and tighten the brake band 71 on the drum 33. This will impede rotation of the nut 37 and cause longitudinal motion of the same on the threaded shaft 32 either forward or backward depending upon the direction of rotation of the screw shaft 32 as it is driven from the shaft 29. The longitudinal motion of nut 37 is transmitted to the thrust shaft 39 which swings the lever 47 in a counterclockwise direction, either by direct contact therewith or by means of the intermediate lever 52, depending on the direction of motion of the thrust shaft 39. The rocking motion of the lever 47 is communicated through link 50, arm 51 and brake shaft 17 to the brake rods 22—25, to operate the brakes. Release of the brake pedal 55 will allow the nut 37 to rotate freely on the screw shaft 32, and the pitch of the threads 32 is made sufficiently steep so that the nut 37 and the thrust shaft 39 will promptly return to its neutral position under the action of the brake releasing spring 75.

An important feature of this invention is that the brakes of the vehicle are applied by a true braking action, the power unit simply multiplying the effort of the operator by any desired constant factor. The operator is thus enabled to stant factor. The operator is thus enabled to feel the brakes take hold exactly as with the ordinary pedal operated brakes, but is called upon to exert only a predetermined fixed fraction of the effort actually required to apply the brakes. This arrangement provides a very delicate control through infinite gradations, with the natural "feel" to which the operator is accustomed.

It is well recognized that the accurate control of the amount of braking force applied, and the ability to instantly release the brakes at will are at least as important as the ability to apply the brakes at all. If the brakes are applied too strongly the wheels slide on the road and thereupon lose most of their traction so that their retarding effect is comparatively slight, and steering becomes erratic or ineffectual. This situation would under many circumstances be worse than if the brakes were entirely inoperative, since it is often possible to steer out of a collision when there is not time enough to stop, but if steering control is lost disaster may occur. The only way to stop such a skid is to instantly release the brakes so that the wheels may roll. Then a second application of the brakes, carefully regulated to secure the maximum braking effect without causing skidding, may be effectual in bringing the car safely to a stop.

It will thus be seen that the accurate control of the brakes by the operator at all times, and his ability to "feel out" the braking effect as provided by the present invention are vitally important.

It will be noted that although this invention has been illustrated in conjunction with a four-wheel braking system, it is equally applicable to other pedal operated brakes by suitably connecting the power means to the pedal shaft as above shown and described. Furthermore, while the structure shown is the embodiment of the invention which is preferred at this time, it is obvious that other embodiments are possible within the scope of the invention, and it is to be understood that the disclosure is to be considered as illustrative only and not as limiting the invention further than as defined in the appended claims.

What is claimed is:

1. In a servo-brake operating mechanism for automobiles, an actuating member driven from a rotating part of the automobile, an operating member adapted to normally rotate therewith, and to be moved longitudinally by relative rotation between the actuating and operating members, a brake arm, and means connecting the brake arm to the operating member so arranged that movement of the operating member in either direction from its normal position will swing the brake arm to apply the brakes.

2. In a servo-brake operating mechanism for automobiles, a rotary actuating member driven from a rotating part of the automobile, a control member having a threaded connection with the actuating member, an operating member movable endwise with the control member, means to restrain rotation of the control member to cause longitudinal movement of the control member and operating member, a brake arm, and connections between the brake arm and the operating member so arranged that longitudinal movement of the operating member in either direction from its normal position will swing the brake arm to apply the brakes.

3. A servo-brake operating mechanism for automobiles comprising a rotary screw shaft driven from a rotating part of the automobile, a traveling nut threaded thereon, a thrust shaft connected to move endwise with the nut, means under the control of the operator for restraining the rotation of the nut to cause longitudinal movement thereof, a brake operating arm, and connections between the thrust shaft and brake arm so arranged that longitudinal movement of the thrust shaft in either direction from its normal position will swing the brake arm to apply the brakes.

4. A brake operating mechanism for automobiles comprising a rotary screw shaft driven from a rotating part of the automobile, a traveling nut threaded thereon, a thrust shaft connected to move endwise with the nut, means under the control of the operator for restraining the rotation of the nut to cause longitudinal movement of the nut and thrust shaft, a lever having a fixed central fulcrum, pivoted at one end to the thrust shaft, a brake operating lever fulcrumed at one end and adapted to be engaged by the thrust shaft and said first mentioned lever whereby movement of the thrust shaft in either direction from its normal position will swing the brake operating lever to apply the brake.

5. A brake operating mechanism for automobiles comprising a rotary screw shaft driven from a rotating part of the automobile, a travelling nut threaded thereon, a thrust shaft movable endwise with the nut, means for restraining the rotation of the nut, said means cooperating with said nut in all operative positions thereof, means for controlling the restraining means, and a longitudinally slidable operative connection between the controlling means and the restraining means, operative connections between the thrust shaft and the brake mechanism whereby longitudinal movement of the thrust shaft will apply the brakes, and means operating on the release of the brakes for returning said nut to its normal position.

6. A brake operating mechanism for automobiles comprising a casing, a rotary screw shaft mounted in the casing, a nut threaded thereon and provided with a friction surface, a member movable with the nut and slidably mounted in the casing, a friction band movable longitudinally with the nut and connected at one end to said member, a plate connected to the other end of the brake band, a rock shaft mounted in the casing parallel to the screw shaft and having a shoulder thereon for cooperation with said plate to move the same, means under the control of the operator for rocking said shaft to thereby control the rotation of the nut relative to said screw shaft and cause it to move longitudinally on the threaded shaft, a brake operating lever, and connections between said member and brake operating lever to actuate the brakes.

7. A brake operating mechanism including two members normally having no relative motion, means for rotating one of said members from a rotatable part, said members having an inclined connection therebetween whereby relative rotation causes relative longitudinal movement in directions depending on the direction of relative rotation, means preventing longitudinal motion of one of said members, and connections between the other member and the brakes to operate said brakes irrespective of the direction of said relative rotation.

8. A brake operating mechanism including a screw member and a nut member normally having no relative motion, means adapted to rotate one of said members from a rotatable part, means causing longitudinal movement of the second member by restraining its rotation, and connections between the moved member and the brakes to operate the latter irrespective of the direction of said relative rotation.

9. A brake operating mechanism including a screw member and a single rotary nut member threaded directly thereon and normally stationary with respect thereto, means operated by a rotatable part and under the control of the operator for causing relative rotation between said members, means preventing longitudinal movement of one of the members, and connections between the other member and the brakes to operate the latter irrespective of the direction of said relative rotation.

10. A power brake operating mechanism for automotive vehicles including two members normally rotated in unison from a rotating part of the vehicle, means for restricting the rotation of one of said members thus causing relative rotation therebetween in a direction depending on the direction of motion of the vehicle, means whereby such relative rotation causes relative longitudinal movement thereof in directions dependent on the direction of relative rotation, brake mechanism, and means connecting said members to the brake mechanism whereby relative longitudinal movement thereof caused by relative rotation of said members in either direction will operate to apply the brakes.

11. A power brake operating mechanism for automotive vehicles including a pair of co-operating screw and nut members normally rotated in unison from a rotating part of the vehicle, means continuously under the control of the operator for restricting the rotation of one of said members thus causing relative rotation therebetween in a direction depending on the direction of motion of the vehicle, means preventing longitudinal movement of one of said members, brake mechanism and means connecting the other of said members to the brake mechanism whereby relative longitudinal movement thereof in either direction will operate to apply the brakes.

12. In a power brake operating mechanism for motor vehicles, an actuating member, an operating member, means under the control of the operator for causing relative rotation between said members, means whereby such relative rotation in either direction causes relative longitudinal movement of one of said members in directions dependent on the direction of relative rotation, brake mechanism, and connections between said members and said brake mechanism whereby relative longitudinal movement of said one member caused by such relative rotation in either direction is effective to operate the brake mechanism.

13. A power brake operating mechanism for motor vehicles including an actuating member, an operating member, means under the control of the operator for causing relative rotation between said members in a direction dependent on the direction of rotation of said rotating part, means whereby such relative rotation in either direction causes relative longitudinal movement of one of said members in directions dependent on the direction of relative rotation, brake mechanism, and connections between said one member and said brake mechanism whereby relative logitudinal movement of said one member caused by such relative rotation in either direction is effective to operate the brake mechanism.

14. In a brake operating mechanism for vehicles, an actuating member driven from a rotating part of the vehicle, a force multiplying unit including two members normally having no relative motion, means for rotating one of said two members from said actuating member, means continuously under the control of the operator for moving one of said two members longitudinally by causing relative rotation between said two members the direction of longitudinal movement being dependent on the direction of relative rotation and connections between the moved member and the brakes to operate the latter irrespective of the direction of said longitudinal movement.

15. A force-multiplying brake operating mechanism for motor vehicles including a power member driven from a rotating part of the vehicle, an actuating member mounted thereon, and normally rotating therewith, said members having a cooperating means whereby relative rotation causes relative translation thereof, means for restricting the rotation of the actuating member, and means whereby the translation of the actuating member in either direction from a normal position is caused to apply the brakes.

16. A force-multiplying brake operating mechanism for motor vehicles including a power member driven from a rotating part of the vehicle, an actuating member for the vehicle brakes mounted thereon and normally rotating therewith, said members having a cooperating means whereby relative rotation causes relative translation thereof, a retarding element for said actuating member, means for mounting said retarding element whereby said element moves longitudinally, substantially in unison with the actuating element, manual means for controlling said retarding element, and operative connections between the actuating member and the vehicle brake mechanism.

17. A force-multiplying brake operating mechanism for motor vehicles including a power member driven from a rotating part of the vehicle, an actuating member mounted thereon and normally rotating therewith, said members having cooperating means whereby relative rotation causes relative translation thereof, brake applying mechanism, and connections between the actuating member and the brake applying mechanism whereby translation of the actuating member in either direction will move the brake applying mechanism in a direction to apply the brakes.

FREDERICK HATHAWAY RAGAN.